United States Patent
Jaffuel

(10) Patent No.: US 11,673,470 B2
(45) Date of Patent: Jun. 13, 2023

(54) CAB COMPRISING AN HOLOGRAPHIC HUMAN-MACHINE INTERFACE AND MOTOR VEHICLE

(71) Applicant: FAURECIA INTERIEUR INDUSTRIE, Nanterre (FR)

(72) Inventor: Arnaud Jaffuel, Mareil-Marly (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 17/722,314

(22) Filed: Apr. 16, 2022

(65) Prior Publication Data
US 2022/0332192 A1    Oct. 20, 2022

(51) Int. Cl.
*B60K 37/02*    (2006.01)
*B60K 35/00*    (2006.01)

(52) U.S. Cl.
CPC .............. *B60K 37/02* (2013.01); *B60K 35/00* (2013.01); *B60K 2370/1464* (2019.05); *B60K 2370/1529* (2019.05); *B60K 2370/29* (2019.05); *B60K 2370/334* (2019.05)

(58) Field of Classification Search
None
See application file for complete search history.

(56) References Cited

U.S. PATENT DOCUMENTS

| | | | | |
|---|---|---|---|---|
| 11,474,360 B2 * | 10/2022 | Haddick | ............ | G02B 27/0176 |
| 2019/0278091 A1 * | 9/2019 | Smits | ................... | H04N 13/363 |
| 2020/0057546 A1 * | 2/2020 | Zhao | ...................... | G06F 3/017 |
| 2021/0070176 A1 * | 3/2021 | Rao | ..................... | G02B 27/0093 |
| 2022/0317463 A1 * | 10/2022 | Urey | ................... | G02B 27/0101 |
| 2022/0326760 A1 * | 10/2022 | Karafin | ................... | G06F 3/017 |

FOREIGN PATENT DOCUMENTS

| | | |
|---|---|---|
| DE | 202014003241 U1 | 7/2015 |
| DE | 102016208096 A1 | 11/2017 |
| FR | 3047933 A1 | 8/2017 |

* cited by examiner

*Primary Examiner* — Andrew J Coughlin
(74) *Attorney, Agent, or Firm* — Reising Ethington P.C.

(57) ABSTRACT

A cab having a human-machine interface to generate a holographic image in order to control comfort equipment installed in the cab. The human-machine interface includes: a camera capable of capturing images representing a gaze of an occupant, one image generation unit having (a) a computer capable of calculating the position of the location of the occupant's gaze from the captured images, the computer being adapted to generate the digital holographic image according to the position of the occupant's gaze, (b) a spatial light modulator receiving the generated digital holographic image, and (c) a light source illuminating the spatial light modulator. The human-machine interface also includes a reflector reflecting the light beams emitted by the spatial light modulator into a visualizing window to form a holographic image positioned between the windscreen and the seat.

10 Claims, 2 Drawing Sheets

CAB COMPRISING AN HOLOGRAPHIC HUMAN-MACHINE INTERFACE AND MOTOR VEHICLE

TECHNICAL FIELD

This disclosure relates to a cab comprising an holographic human-machine interface. In particular, this disclosure relates to a holographic human-machine interface capable of controlling comfort equipment of a motor vehicle, and a motor vehicle equipped with that interface.

BACKGROUND

In the field of military aviation, head-up displays make it possible to display images on a semi-transparent mirror using a projector. These images are superimposed on the landscape and allow the pilot to monitor his environment and the data provided by these images at the same time. Head-up displays have also been developed for the automotive field. Information pertaining to safety can thus be projected onto a semi-transparent blade or onto the vehicle's windshield. These head-up displays project, for example, the safety distance. However, head-up displays can only project images to the outside the vehicle. In addition, these displays do not allow to control on-board comfort equipment. Lastly, these displays are expensive because they require the implementation of a retractable semi-transparent blade or the manufacture of a specific windshield including a non-parallel geometry of the external main faces to avoid the presence of a double image.

SUMMARY

It would be advantageous to develop a holographic human-machine interface that makes it possible to control embedded comfort equipment and that is inexpensive.

The present invention relates to a cab comprising an holographic human-machine interface to generate at least one holographic image in order to control at least one comfort equipment installed in the cab, the cab having a windshield, at least one comfort equipment and at least one seat configured for an occupant, the human-machine interface comprising:
  at least one camera capable of capturing images representing at least one gaze of the occupant,
  an image generation unit comprising:
    (a) a computer connected to the camera, the computer being capable of calculating the position of the location of the occupant's gaze from the captured images, the computer being adapted to generate said at least one digital holographic image to control said comfort equipment according to the position of the occupant's gaze,
    (b) a spatial light modulator connected to the computer to receive said at least one generated digital holographic image, (c) a coherent light source capable of illuminating the spatial light modulator, the spatial light modulator emitting light beams,
  a reflector adapted to reflect the light beams emitted by the spatial light modulator into a visualizing window in order to form said at least one holographic image positioned between the windshield and the seat as a control interface.

The features set out in the following paragraphs may, optionally, be implemented. They can be implemented independently of each other or in combination with each other.

According to one embodiment, the human-machine interface comprises a recognition device connected to said at least one comfort equipment, said recognition device being adapted to recognize at least one position of a finger and/or one gesture of the hand of said occupant on said at least one holographic image, and to control said at one least comfort equipment according to said at least one position and/or one recognized gesture.

According to one embodiment, the at least one holographic image is visualized at a distance of more than 20 centimeters, and preferably less than 50 centimeters of said windshield. Advantageously, the visualized holographic image is at a distance less than the length of an arm so that the seat occupant can easily touch the image to control the comfort equipment.

According to one embodiment, the reflector consists of a reflection area of the windshield of the motor vehicle, said windshield has a first external main face and a second external main face opposed and parallel to the first external main face. Advantageously, this device works with any type of windshield. It is not necessary to manufacture a particular windshield with a wedge angle to avoid duplication of images. It works regardless of the curvature of the windshield or the inclination thereof. This device can be simply and economically added to any already existing vehicle. It is also very economical for new vehicles because it does not require manufacturing a special windshield.

According to one embodiment, the reflector comprises a semi-transparent blade positioned in the interior compartment at the level of the windshield.

According to one embodiment, the human-machine interface comprises an optical system capable of enlarging said at least one holographic image.

According to one embodiment, the human-machine interface comprises an orientatable reflective system comprising a mirror and a mirror orientation system mobile along two perpendicular axes, wherein the orientation system is connected to the computer and receives mirror inclination controls according to the position of the pupils located from the images captured by the at least one camera.

According to one embodiment, the cab comprises a dashboard, the at least one camera being fixed on the dashboard at the level of the seat.

According to one embodiment, at least one comfort equipment is equipment among a heating and/or air conditioning device, an infotainment device and a central control device.

According to one embodiment, the human-machine interface further comprises a haptic device capable of giving a tactile feeling and a kinesthetic perception when the occupant touches the visualized holographic image.

The invention also relates to a motor vehicle having a windshield, at least one comfort equipment and at least one seat, characterized in that it comprises a human-machine interface as described above.

DETAILED DESCRIPTION

Figure 1:
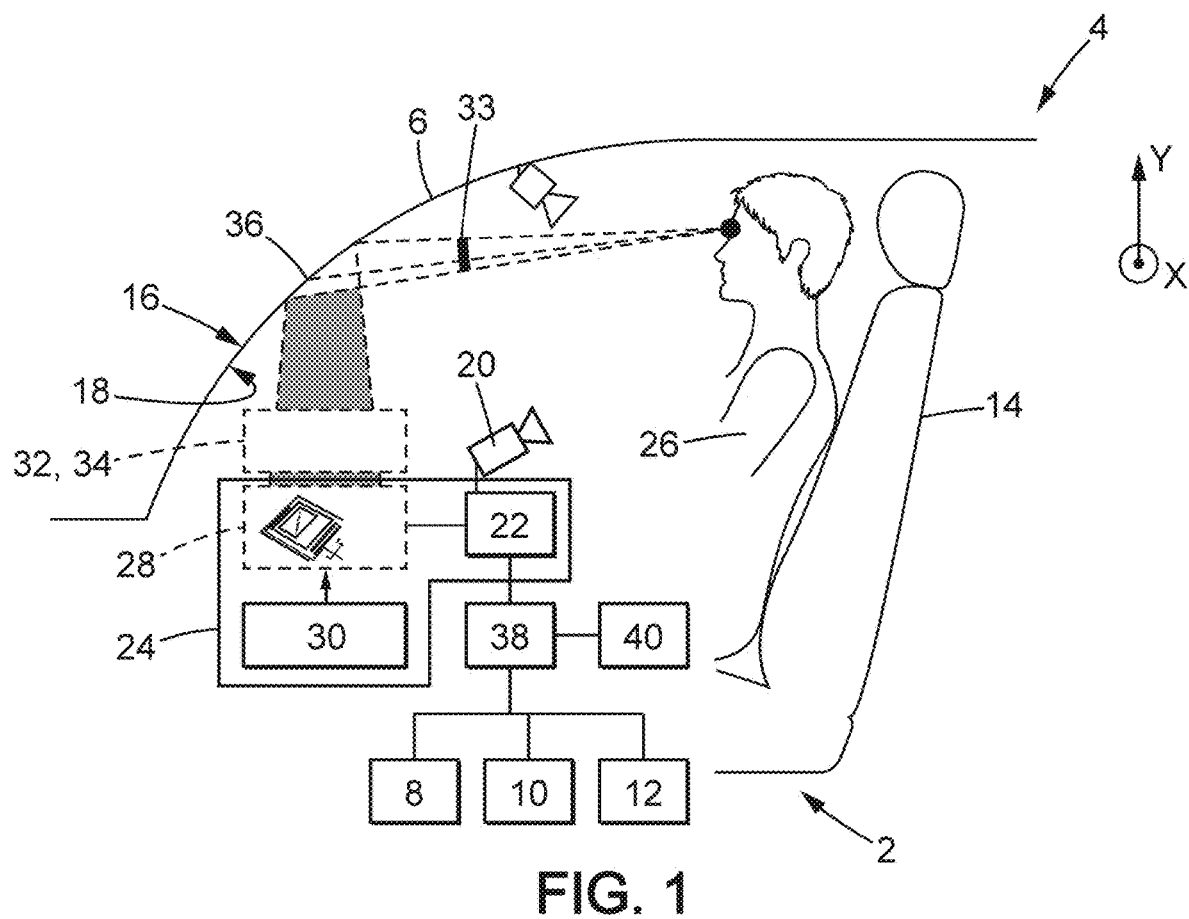
FIG. 1 is a schematic view of a holographic human-machine interface according to the present disclosure

With reference to FIG. 1, the cab according to the present disclosure may be a cab 4 of a vehicle, e.g., a motor vehicle, an aircraft, a train or a boat. Conventionally, the vehicle equipped with the cab 4 delimits an inner compartment. The cab includes a human-machine interface 2, a windshield 6, at least one seat 14 arranged facing the windshield, a dashboard, an inner rear-view mirror and embedded comfort equipment 8, 10, 12.

In the embodiment shown in FIG. 1, the windshield 6 comprises a first external main face 16 and a second external main face 18 opposed and parallel to the first external face 16.

The seat 14 is a seat located at the front of the vehicle. The seat 14 can be the driver seat or the passenger seat. For the sake of simplification, FIG. 1 represents only one seat. Comfort equipment 8, 10, 12 may, for example, include a heating and/or air conditioning device 8, an infotainment device 10, a central control device 12.

The human-machine interface 2 according to the present disclosure comprises at least one camera 20, a computer 22 connected to the camera and an image generation unit 24. The camera 20 is capable of capturing images representing at least the pupils of a person 26 sitting in seat 14. This person is referred to as the occupant in the rest of the description. The camera 20 can be fixed to the dashboard at the level of the seat occupant. Alternatively, the camera 20 can also be fixed to the ceiling of the cab. In particular, the camera can be located in a central position, for example next to the inner rear-view mirror or on a central console. Alternatively, the human-machine interface 2 can have multiple cameras. The computer 22 is a central processing unit, such as a processor or microprocessor. The computer 22 can be a programmable device that uses software, a specific integrated circuit (ASIC) or part of the control unit of a motor (ECU). The computer 22 comprises a memory and a code executable to implement a localization method of the position of the seat occupant's gaze from the captured images as well as a method for generating at least one two-dimensional digital holographic image. Advantageously, the localization method implements the gaze tracking technique to generate digital holographic images with variable focal points depending on the localized position of the occupant's gaze. Accommodation and vergence problems for the occupant 26 are thus avoided.

Figure 2:
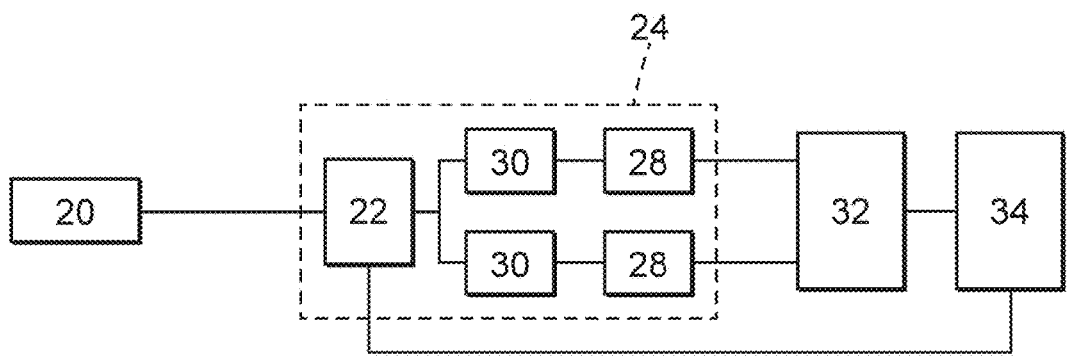
FIG. 2 is a schematic view of the image generation unit.

Advantageously, the holographic image is a binocular image in color and in two dimensions. The image generation unit 24 comprises a spatial light modulator (SLM) 28 connected to the computer 22 to receive the digital holographic images generated by it, a source 30 capable of generating coherent light, a magnifying optical system 32 and a tilting reflective system 34. An example of an image generation unit 24 is shown in FIG. 2. In this non-limiting example, the image generation unit 24 includes two SLM modulators 28 and two sets of light-emitting diodes 30 to generate a right and left binocular image.

The SLM modulators 28 are for example of the crystal liquid on silicon type. Each set of light-emitting diodes 30 includes a red light-emitting diode, a green light-emitting diode, and a blue light-emitting diode. Each set 30 is arranged in the vicinity of an SLM modulator and illuminates it so that the SLM modulator 28 emits radiation around an optical axis crossed by the magnifying optical system 32 and the tilting reflective system 34. The magnifying optical system 32 comprises a set of lenses that merging the binocular images generated by the modulators. The magnifying optical system 32 is also configured to enlarge the holographic images generated in the visualizing window 33. The orientatable reflective system 34 comprises a reflective mirror mounted on a mobile or tiltable mirror orientation system along two perpendicular axes. The orientation system makes it possible to move the holographic images in the visualizing window according to two perpendicular directions represented by the X and Y axes in FIG. 1. The orientatable reflective system 34 is connected to the computer 22 which transmits thereto mirror inclination controls according to the position of the pupils located by the implementation of the localization method from the images captured by the camera 20. Alternatively, the sources 30 are laser sources. The human machine interface 2 according to the present disclosure also includes a reflector 36 and a recognition device 38.

The reflector 36 receives radiation emitted by the spatial light modulator, magnified by the optical system 32 and reflected by the orientatable reflective system 34, and reflects it back into the visualization window located in the interior compartment between windshield 6 and seat 14. This radiation generates the visualization of at least one holographic image by the seat occupant. This holographic image is positioned between the windshield and the seat, especially between the windshield, and the occupant sitting on the seat.

Advantageously, the holographic image is visualized at a distance of more than 20 centimeters, and preferably less than 50 centimeters from the windshield. In other words, the holographic image is visualized at a distance of more than 60 centimeters, and preferably less than 80 centimeters from the seat.

Advantageously, this positioning of or holographic images (s) allows the occupant to touch the holographic image without the need to advance his chest towards the dashboard. According to the embodiment illustrated in FIG. 1, the reflector 36 is constituted by a reflection area belonging to the windshield 6. Advantageously, the windshield is a conventional windshield that does not have a non-parallel geometry of the external main faces.

According to a non-shown alternative, the reflector 36 consists of a semi-transparent blade positioned in the cab at the level of the windshield and substantially parallel thereto. This semi-transparent blade can be retractable into the dashboard or fixed.

The recognition device 38 is able to recognize the position of a limb of the occupant with respect to the visualized holographic image. The limb is for example the hand or a particular finger thereof. The recognition device 38 includes one or several camera(s) capturing images of the occupant and optionally one or several motion sensors. The recognition device 38 includes a processor, a memory and a code which is executable to implement a recognition method of the position of the occupant limb with respect to the visualized image. To this end, the recognition device 38 is connected to the computer 22 which transmits data thereto that allow it to know the position at which the user will visualize a holographic image.

The recognition device 38 is connected to the comfort equipments 8, 10, 12. It is capable of controlling this equipment according to the positions of the occupant's limb and the controls it represents for the occupant.

Advantageously, the human machine interface 2 further comprises a haptic device 40 capable of giving a tactile feeling and a kinesthetic perception when the occupant touches the visualized holographic image. This haptic device is, for example, a surface that generates ultrasonic signals capable of giving an resistance impression specific to the touch of a real surface in the air. The haptic device 40 is connected to the recognition device 38.

Figure 3:
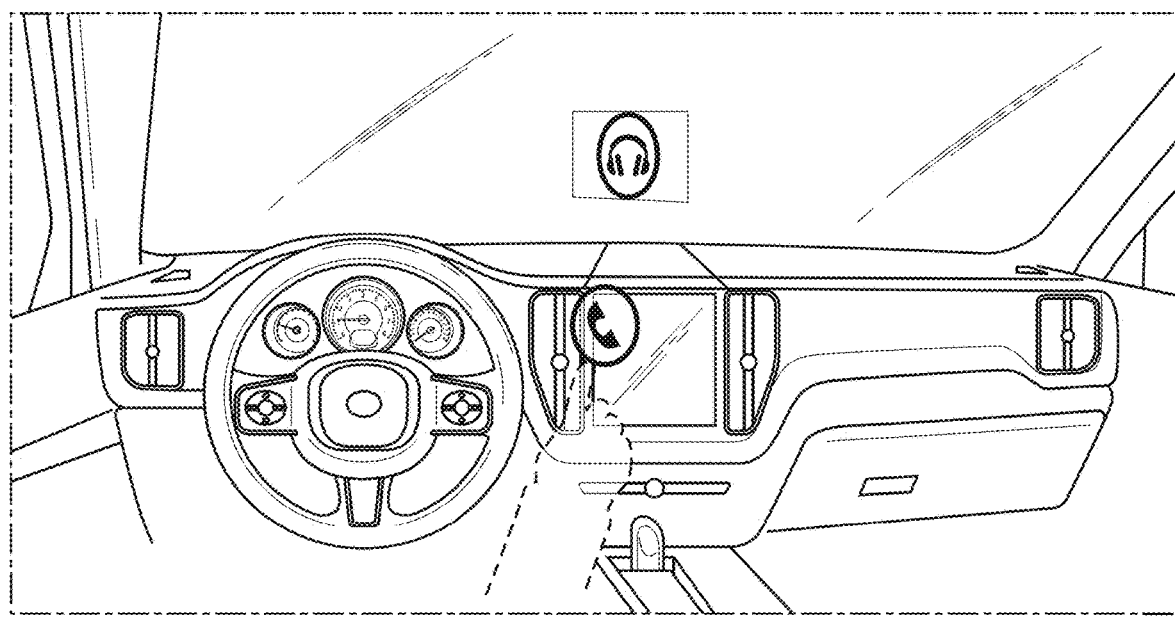
FIG. 3 is a representation of a cab in which a holographic image is visible.

FIG. 3 shows an example of a human-machine interface 2 according to the present disclosure. This human-machine interface 2 includes the holographic image.

The invention claimed is:

1. Cab comprising a holographic human-machine interface to generate at least one holographic image in order to control at least one comfort equipment installed in the cab, the cab having a windshield, the at least one comfort equipment, and at least one seat configured for an occupant, the human-machine interface comprising:
   at least one camera capable of capturing images representing at least one gaze of said occupant,
   one image generation unit comprising:
   (a) a computer connected to the at least one camera, the computer being capable of calculating the position of the location of the occupant's gaze from the captured images, the computer being adapted to generate said at least one digital holographic image with variable focal points to control said comfort equipment according to the position of the occupant's gaze,
   (b) a spatial light modulator connected to the computer to receive said at least one generated digital holographic image,
   (c) a coherent light source capable of illuminating the spatial light modulator, the spatial light modulator emitting light beams,
   a reflector adapted to reflect the beams of light emitted by the spatial light modulator in a visualizing window in order to form at least one holographic image positioned between the windshield and the seat as a control interface, and
   an orientatable reflective system comprising a mirror and a mirror orientation system mobile along two perpendicular axes, wherein the orientation system is connected to the computer and receives mirror inclination controls according to the position of the occupant's pupils located from the images captured by the at least one camera.

2. Cab according to claim 1, comprising a recognition device connected to said at least one comfort equipment, said recognition device being adapted to recognize at least one position of a finger and/or one gesture of the hand of said occupant on said at least one holographic image, and to control said at least one comfort equipment according to said at least one position and/or one recognized gesture.

3. Cab according to claim 1, wherein said at least one holographic image is visualized at a distance of more than 20 centimeters, and preferably less than 50 centimeters of said windshield.

4. Cab according to claim 1, wherein the reflector consists of a reflection area of the windshield of the motor vehicle, said windshield has a first external main face and
a second external main face opposed and parallel to the first external main face.

5. Cab according to claim 1, wherein the reflector comprises a semi-transparent blade positioned in the interior compartment at the level of the windshield.

6. Cab according to claim 1, which comprises an optical system capable of enlarging said at least one holographic image.

7. Cab according to claim 1, comprising a dashboard, the at least one camera being fixed on the dashboard at the level of the seat.

8. Cab according to claim 7, wherein the at least one comfort equipment is equipment among a heating and/or air conditioning device, an infotainment device and a central control device.

9. Cab according to claim 1, which further comprises a haptic device capable of giving a tactile feeling and a kinesthetic perception when the occupant touches the visualized holographic image.

10. Motor vehicle having a windshield, at least one comfort equipment and at least one seat, wherein the motor vehicle comprises a cab according to claim 1.

* * * * *